US007720716B2

(12) United States Patent
Bassey et al.

(10) Patent No.: US 7,720,716 B2
(45) Date of Patent: May 18, 2010

(54) SYSTEM AND METHOD FOR USE BY VARIOUS DEPARTMENTS TO PREPARE A QUOTATION

(76) Inventors: Kenneth Q. Bassey, 28179 Schroeder St., Farmington Hills, MI (US) 48331; Jasmin Cerkic, 2763 N. Lincoln Ave., Chicago, IL (US) 60625

( * ) Notice: Subject to any disclaimer, the term of this patent is extended or adjusted under 35 U.S.C. 154(b) by 788 days.

(21) Appl. No.: 10/483,480

(22) PCT Filed: Jul. 12, 2002

(86) PCT No.: PCT/US02/22249

§ 371 (c)(1),
(2), (4) Date: Jul. 14, 2004

(87) PCT Pub. No.: WO2004/006154

PCT Pub. Date: Jan. 15, 2004

(65) Prior Publication Data

US 2004/0243473 A1   Dec. 2, 2004

Related U.S. Application Data

(60) Provisional application No. 60/305,279, filed on Jul. 12, 2001.

(51) Int. Cl.
*G06Q 30/00* (2006.01)
(52) U.S. Cl. .......................................... 705/26; 705/27
(58) Field of Classification Search .................... 705/26, 705/27
See application file for complete search history.

(56) References Cited

U.S. PATENT DOCUMENTS

| 4,992,940 | A | 2/1991 | Dworkin |
| 5,008,853 | A | 4/1991 | Bly et al. |
| 5,249,120 | A | 9/1993 | Foley |
| 5,717,924 | A | 2/1998 | Kawai |
| 5,842,178 | A | 11/1998 | Giovannoli |
| 5,970,476 | A | 10/1999 | Fahey |
| 6,023,683 | A | 2/2000 | Johnson et al. |
| 6,115,690 | A | 9/2000 | Wong |
| 6,212,549 | B1 | 4/2001 | Page et al. |
| 6,370,562 | B2 | 4/2002 | Page et al. |
| 6,684,189 | B1 * | 1/2004 | Ryan et al. ..................... 705/4 |
| 2001/0032154 | A1 * | 10/2001 | Schummer .................. 705/30 |
| 2005/0198042 | A1 * | 9/2005 | Davis ........................... 707/10 |
| 2005/0283410 | A1 * | 12/2005 | Gosko ......................... 705/27 |

FOREIGN PATENT DOCUMENTS

| JP | 07093414 | 4/1995 |
| JP | 2001175727 | 6/2001 |

OTHER PUBLICATIONS

"Internet Capital Group Acquires Stake in Emptoris, Inc." Business Editors. Business Wire. New York: Apr. 27, 2000. p. 1. Retrieved via ProQuest on Jan. 25, 2010.*

* cited by examiner

*Primary Examiner*—Jeffrey A. Smith
*Assistant Examiner*—Michael A. Misiaszek
(74) *Attorney, Agent, or Firm*—Russ Weinzimmer

(57) ABSTRACT

A quotation system and method are provided (see FIG. 1). A relational database (10) allows various departments (14, 16, 18, 20) to prepare a quotation. The relational database centralizes data to increase efficiency, and the data may be modified, as needed, for particular quotation solutions.

13 Claims, 4 Drawing Sheets

SYSTEM AND METHOD FOR USE BY VARIOUS DEPARTMENTS TO PREPARE A QUOTATION

CROSS-REFERENCE TO RELATED APPLICATION

This application claims the benefit of U.S. provisional application Ser. No. 60/305,279, filed Jul. 12, 2001.

BACKGROUND OF THE INVENTION

1. Field of the Invention

The present invention relates to a quotation system and method.

2. Background Art

The existing process for preparing a quotation, more specifically, a quotation for a custom-made product, is oftentimes cumbersome and inefficient for a number of reasons. For example, automotive suppliers mass produce products that are uniquely designed to customer specifications for assembly into vehicles. The automotive supplier uses a list of manufacturing processes and/or assembly components that are purchased from sub-suppliers. An automotive supplier is typically given about ten days to respond to a customer request for quotation. Within this ten-day or other reasonably short period of time, a rigorous business process takes place whereby people from multiple departments must contribute information and expertise to assess the design, manufacturing process, capacity, cost, investment, price, strategy, and logistics. Then, the supplier must submit its quotation in a format specified by the customer.

Due to the short period of time allowed by the customer for the supplier to prepare the quotation, the supplier typically faces difficult challenges when developing the quotation. For example, the supplier is faced with applying enormous overhead to process a request for quotation through its system and deliver a quotation to the customer within the short period of time. For example, the supplier may sometimes skip some approval steps or make assumptions to ensure timely submission of the quotation. This may result in inaccuracies and have undesirable results, particularly in markets with thin margins. For example, the supplier may be forced to deliver a late quotation due to the time constraints imposed by the customer. These are just a few examples of the difficulties faced by a supplier when preparing a quotation. Other obstacles faced by the supplier include the fact that sometimes geography and international borders separate contributors and approvers, making it difficult to manage and oversee the entire quotation process.

One technique for preparing quotations that is used today is a spreadsheet-based quotation technique. That is, various departments make calculations using spreadsheets and pass these spreadsheets along to each other using, for example, electronic mail. This results in data being separated from its origin, being difficult to track, and being nearly inaccessible for a subsequent analysis. As such, spreadsheet passing techniques used today, although sometimes successful, do have their shortcomings. Although the example given above relates specifically to automotive suppliers, this is only exemplary, and other industries may face similar problems in preparing quotations.

In addition, some attempts have been made to develop quotation software. Typically, existing quotation software involves substantial hard-coding and lacks the flexibility that is often needed to prepare customized quotations, such as, for example, in the automotive industry. Many times, a supplier will have their own particular way of performing cost calculations, and does not want to be restricted to the hard-coded techniques in the quotation software. Because existing quotation software lacks the desirable flexibility, many suppliers have stayed away from these existing software solutions. As a result, suppliers continue to use spreadsheet passing techniques which, as described above, also have shortcomings. Examples of quotation systems and methods are shown in U.S. Pat. Nos. 6,115,690; 5,970,476; 5,842,178; 5,717,924; 5,249,120; 5,008,853; 4,992,940; 6,212,549; and 6,370,562.

For the foregoing reasons, there is a need for a quotation system and method that overcomes the shortcomings of existing quotation preparation techniques.

SUMMARY OF THE INVENTION

It is, therefore, an object of the present invention to provide an improved quotation system and method that utilizes a relational database to centrally manage data accessed by multiple departments during the preparation of a quotation for a customer.

In carrying out the above object, a quotation system and method are provided. The system includes a relational database having a number of relations to relate, for example, manufacturing processes, cost parameters, calculations, and work flows so that various departments may prepare a quotation with improved accuracy, reduced overhead expenses, and faster delivery.

In one example, a sales department, design engineering department, process engineering department, and purchasing department all have access to the relational database to facilitate preparation of a quotation. The relational database provides centralized data that overcomes limitations associated with spreadsheet passing and related methods. In addition, the relational database provides flexibility in that relational database data may be modified or added to change the way calculations are performed. The ability to modify the data in the relational database overcomes limitations associated with hard-coded quotation software solutions. As such, systems and methods of the present invention allow a supplier, with various departments, to efficiently prepare a quotation. In addition, systems and methods of the present invention allow modification of the data so that the relational database may be adapted to the needs of different suppliers.

The above object and other objects, features, and advantages of the present invention are readily apparent from the following detailed description of the preferred embodiment when taken in connection with the accompanying drawings.

DETAILED DESCRIPTION OF THE PREFERRED EMBODIMENT

Figure 1:
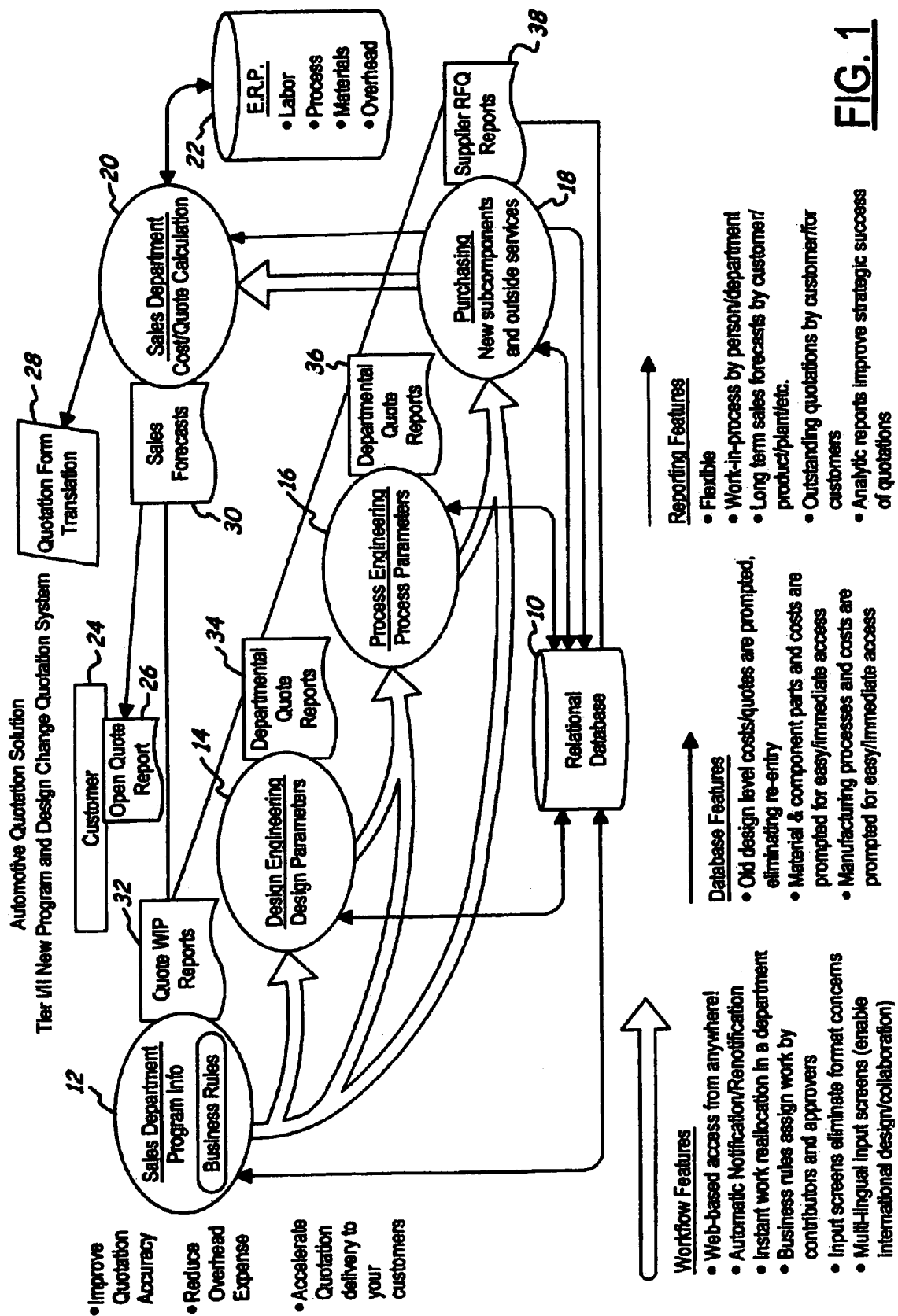
FIG. 1 is a work flow diagram illustrating work flow among a sales department, design engineering department, process engineering department, and purchasing department, as well as the relational database.

In FIG. 1, a relational database is indicated at 10. The relational database is recorded on a computer-readable medium and may be implemented in a variety of ways as appreciated by one of ordinary skill in the art. Preferably, the relational database is implemented using a database management system (DBMS), such as SQL SERVER available from Microsoft. Sales department 12, design engineering department 14, process engineering department 16, and purchasing department 18 may all interact with database 10. The sales department is also indicated at 20, receiving the quotation in a final stage. Sales department 20 has access to additional information in database 22 so that sales department 20 may work with the cost structure provided by the other departments to develop a quote structure for the quotation being given to customer 24 as report 26. The present invention also contemplates quotation form translation 28 for providing other language quotations. As shown, quote reports are present at each department (32, 34, 36, 38). Sales department 20 also may create sales forecasts 30 as further described below.

Although the preferred implementation illustrated in the drawings relates to an automotive quotation solution, embodiments of the present invention may be useful for other applications where customized quotations and/or customized products are desired. The relational database 10 allows departments to collaborate only when necessary resulting in improved quotation accuracy, reduced overhead expense, and accelerated quotation delivery to customer 24. In addition, FIG. 1 depicts preferred work flow, database, and reporting features. Preferred embodiments of the present invention, in addition to utilizing relational database 10 to prepare quotations, facilitate long-term forecasting. In a preferred implementation, for example, in an automotive quotation solution, vehicle set and vehicle volume information are provided to sales department 20 via database 10 to allow comprehensive sales and margin reporting. In a traditional approach, vehicle sets and vehicle volumes are gathered with a tedious process requiring months of work and analysis to provide sales and margin reporting. In accordance with the present invention, by providing this or other suitable information to relational database 10, the efficiencies of the quotation system and method of the present invention may be applied to long-term forecasting applications, as well as quotation preparation applications.

As FIG. 1 illustrates the relational database and associated work flows, it is understood that a suitable interface is provided so that the various departments may interface with relational database 10. For example, a web-based interface is preferred to allow access to relational database 10 from anywhere. Interfaces may be customized for individual departments and further customized for contributors and approvers. For example, sales department 12 may access relational database 10 via a new quote request screen that allows sales department 12 to enter the description and specification into relational database 10. Thereafter, the various other departments use appropriate interface screens to select, modify, and add parameters as necessary to develop the quotation. The interfaces for each department may be designed specifically for that department such that only needed information is available. For example, design engineering department 14 is given an interface that illustrates only information needed by design engineering department 14 and similarly for other departments. And as mentioned above, interface screens may be further customized within a department, for example, contributors and approvers may have slightly different interfaces or permissions to modify values within relational database 10.

In addition to the interface screens that correspond to the work flows, additional interface screens may be provided for users outside of the work flow. For example, a plant controller may use an administrative screen to control certain parameters that apply to many or all parts (for example, labor rates).

It is appreciated that in accordance with the present invention, relational database 10 centralizes data associated with the quotation and overcomes shortcomings associated with spreadsheet passing and other previously known techniques for generating quotations. In addition, relational database data may be modified or added to change the way calculations are performed to meet the needs of a particular supplier or quotation preparer. If desired, the relations may be modified to integrate with legacy systems at a supplier. And, as such, the ability to customize the relations provides added flexibility that overcomes shortcomings associated with hard-coded quotation software used in the past. Although some examples were given above for specific interface techniques to interface the departments to relational database 10, it is appreciated that those skilled in the art of relational databases and database management systems understand that a wide variety of interfaces may be used to achieve embodiments of the present invention, and the present invention is not limited to any particular form of database interface. Further, although a preferred implementation of the present invention has been described with reference to materials, components, processes, and other elements applicable to automotive quotation solutions, it is appreciated that the specific details and attributes of relational database 10 may vary widely as understood by one of ordinary skill in the art of relational databases.

Figure 2:
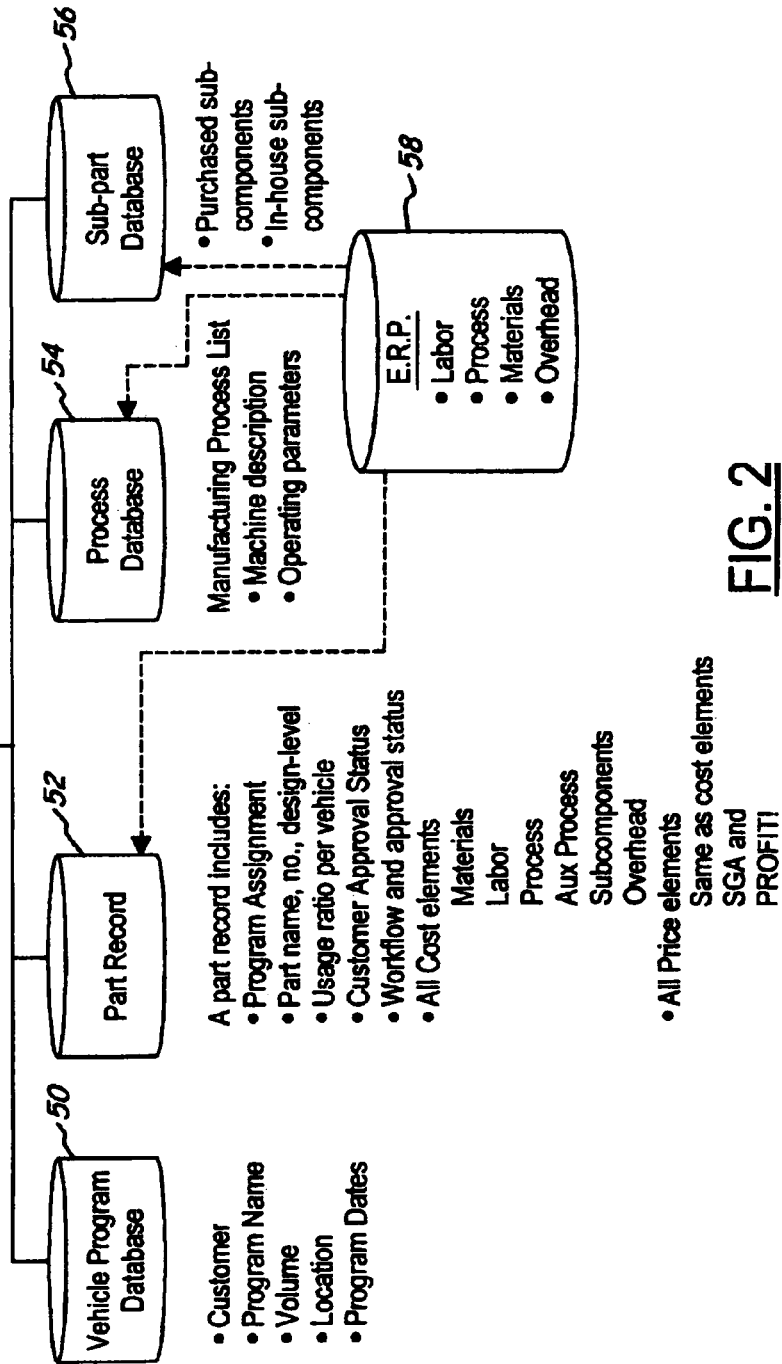
FIG. 2 is a block diagram illustrating a preferred embodiment wherein a single relational database includes portions representing vehicle program information, part record information, process information, and sub-part information.
Figure 3:
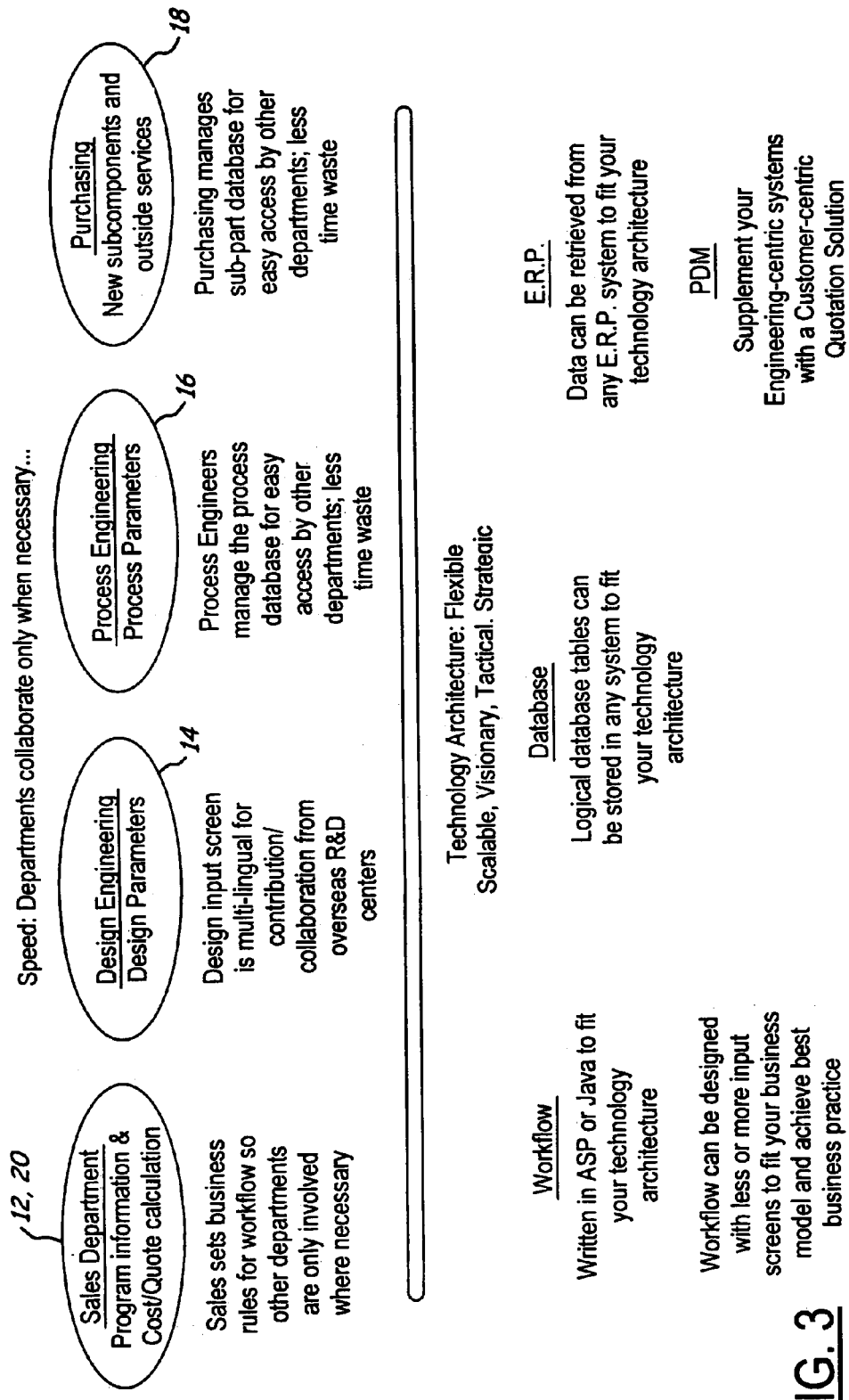
FIG. 3 illustrates the cooperation of various departments in a preferred embodiment.

FIG. 2 illustrates that the relational database preferably includes other information (in an automotive supplier application), such as vehicle program information 50, part record information 52, process information 54, and sub-part information 56, as well as information 58. FIG. 2 also illustrates an example of specific information for database 10 underneath each sub-database. FIG. 3 further illustrates departments 12, 14, 16, 18, 20 and illustrates other features and advantages of the present invention.

Figure 4:
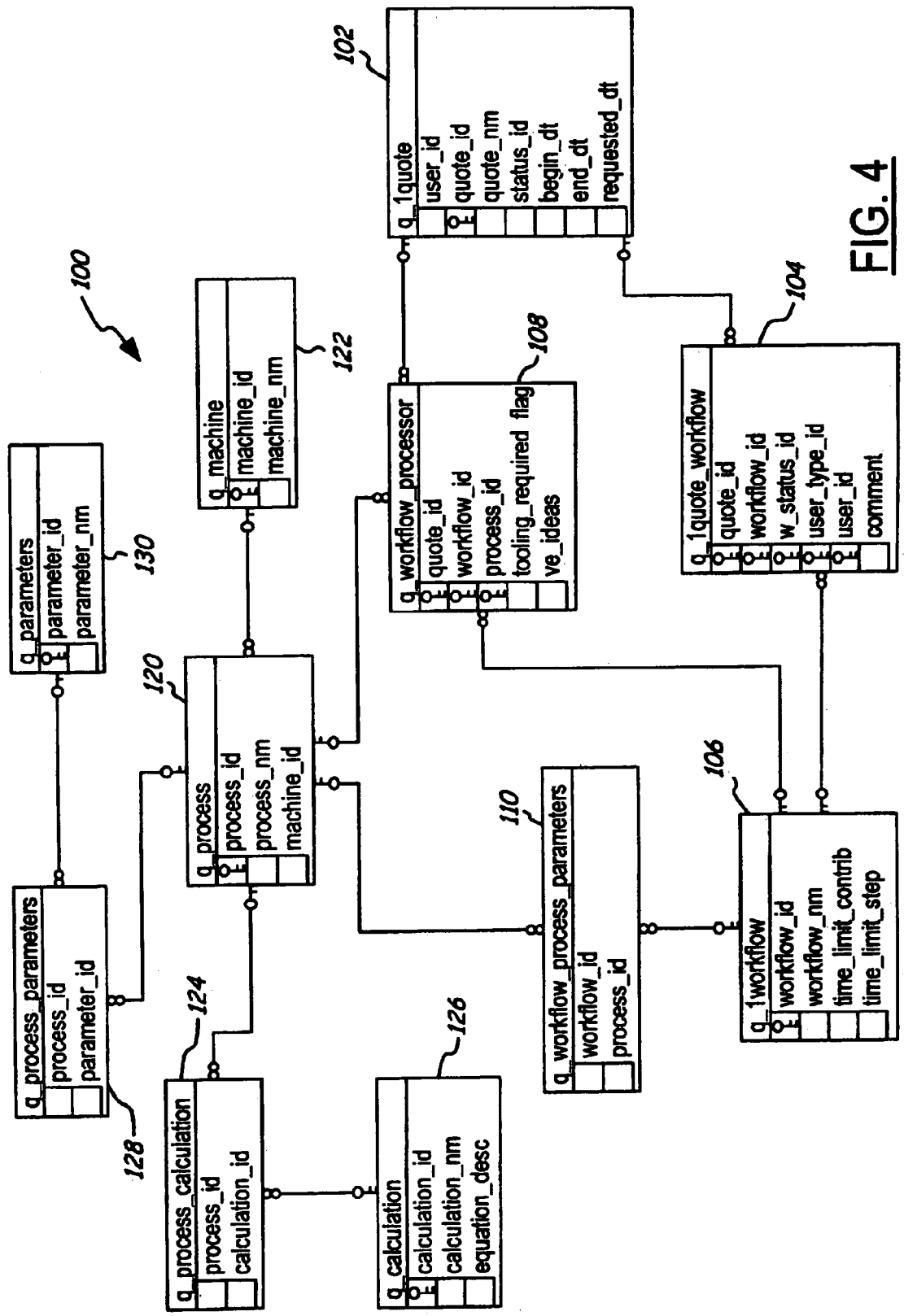
FIG. 4 illustrates an example of the flexibility of the relational database, illustrating a number of relations including processes, process parameters, and calculations with data that may be customized to suit the needs of particular suppliers.

FIG. 4 illustrates an exemplary portion of a set of relations used in an exemplary embodiment of the present invention. That is, data in relational database 10 may be modified for a particular application, as needed, overcoming problems associated with hard-coded software packages used in the past. As shown in FIG. 4, a set of relations is generally indicated at 100. Each relation includes a number of attributes, and indicates, where appropriate, keys. Relations 102, 104, 106, 108, and 110 illustrate attributes relating to quotation identification and work flow. In accordance with a preferred embodiment of the present invention, relation 120 includes attributes related to process. As shown, relation 120 includes process identification, process name, and machine identification. Relation 122 includes machine identification and machine name. Relation 124 includes process identification and calculation identification. Relation 126 includes calculation identification, calculation name, and equation description. In accordance with the present invention, data corresponding to equation description of relation 126 may be modified, as needed, to suit the needs of a particular quotation preparer to allow customization of the internal calculations of relational database 10. Further, relation 128 includes attributes for process identification and parameter identification, and relation 130 includes attributes for parameter identification, and parameter name. That is, the calculation is a function of parameters for a particular process to determine the cost of the process. In accordance with the present invention, the technique utilized to perform the calculation may be modified, as needed, for a particular application. As such, data in relational database 10 can be customized, as needed, for particular applications, without the extreme expense associated with re-developing a hard-coded application from the start.

In a preferred implementation of the relational database, the ability to modify and add data includes the ability to add new processes. The ability to add new processes may be made available to the supplier. In addition, new parameters and new calculations may be associated with the new process. Similarly, embodiments of the present invention contemplate the ability to add new materials, new components, and other new information to relational database 10 without disturbing the overall organization of the data.

Further, in a preferred embodiment, various parameters may be assigned to different user types. For example, a certain group of parameters may be modifiable only by design engineers, another group of parameters may be modifiable only by process engineers, and so on.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for use by various departments to prepare a quotation, the method comprising:

accessing a relational database recorded on a computer-readable medium to assist in preparing the quotation, the relational database being accessed by the various departments and providing centralized data recorded on the computer-readable medium, the centralized data including a plurality of relations to relate manufacturing processes, cost parameters, calculations, and work flows;

wherein each of the various departments, in accordance with the work flows, accesses the relational database through a customized interface configured to allow limited access to the relational database based on the corresponding department;

wherein the plurality of relations includes a first relation including a quotation identification attribute, a second relation including a calculation identification attribute and an equation description attribute, and a plurality of additional relations that dictate the use of the second relation in preparing a quotation identified by data corresponding to the quotation identification attribute of the first relation;

wherein the relational database is configured to allow modification of the second relation to modify data corresponding to the equation description attribute to change the way calculations are performed when preparing the quotation, thereby allowing techniques utilized to perform calculations to be customized as needed for particular applications;

processing information in the relational database to prepare the quotation in accordance with the plurality of relations;

wherein when preparing a quotation identified by data corresponding to the quotation identification attribute of the first relation, the current data corresponding to the equation description attribute of the second relation determine the way calculations are performed when preparing the quotation, and the plurality of relations determines the way that the relational database manipulates data to determine the way that the calculations affect the prepared quotation; and providing the quotation to a user.

2. The method of claim 1 further comprising:
   modifying the second relation to modify data corresponding to the equation description attribute to change the way that calculations are performed by the relational database for preparing the quotation.

3. The method of claim 1 wherein the additional relations further comprise:
   a third relation including the calculation identification attribute and a process identification attribute, the third relation affecting the way that the relational database manipulates data to determine the way that the calculations affect the prepared quotation.

4. The method of claim 3 wherein the additional relations further comprise:
   a fourth relation including the quotation identification attribute and the process identification attribute, the fourth relation affecting the way that the relational database manipulates data to determine the way that the calculations affect the prepared quotation.

5. The method of claim 4 wherein the additional relations further comprise:
   a fifth relation including the process identification attribute and a machine identification attribute, the fifth relation affecting the way that the relational database manipulates data to determine the way that the calculations affect the prepared quotation.

6. The method of claim 5 wherein the additional relations further comprise:
   a sixth relation including the machine identification attribute and a machine name attribute, the sixth relation affecting the way that the relational database manipulates data to determine the way that the calculations affect the prepared quotation.

7. The method of claim 4 wherein the additional relations further comprise:
   a fifth relation including the process identification attribute and a parameter identification attribute, the fifth relation affecting the way that the relational database manipulates data to determine the way that the calculations affect the prepared quotation.

8. The method of claim 7 wherein the additional relations further comprise:
   a sixth relation including the parameter identification attribute and a parameter name attribute, the sixth relation affecting the way that the relational database manipulates data to determine the way that the calculations affect the prepared quotation.

9. The method of claim 4 wherein the additional relations further comprise:
   a fifth relation including the quotation identification attribute and a workflow identification attribute, the fifth relation affecting the way that the relational database manipulates data to determine the way that the calculations affect the prepared quotation.

10. The method of claim 9 wherein the additional relations further comprise:
    a sixth relation including the workflow identification attribute and a workflow name attribute, the sixth relation affecting the way that the relational database manipulates data to determine the way that the calculations affect the prepared quotation.

11. The method of claim 9 wherein the additional relations further comprise:
   a sixth relation including the workflow identification attribute and the process identification attribute, the sixth relation affecting the way that the relational database manipulates data to determine the way that the calculations affect the prepared quotation.

12. A system for use by various departments to prepare a quotation, the system comprising:
   a relational database recorded on a computer-readable medium to assist in preparing the quotation, the relational database being accessed by the various departments and providing centralized data recorded on the computer-readable medium, the centralized data including a plurality of relations to relate manufacturing processes, cost parameters, calculations, and work flows for the various departments;
   wherein the plurality of relations includes a first relation including a quotation identification attribute, a second relation including a calculation identification attribute and an equation description attribute, and a plurality of additional relations that dictate the use of the second relation in preparing a quotation identified by data corresponding to the quotation identification attribute of the first relation;
   wherein the relational database is configured to allow modification of the second relation to modify data corresponding to the equation description attribute to change the way calculations are performed when preparing the quotation, thereby allowing techniques utilized to perform calculations to be customized as needed for particular applications;
   wherein the relational database is configured to process information in the relational database to prepare the quotation in accordance with the plurality of relations; wherein when preparing a quotation identified by data corresponding to the quotation identification attribute of the first relation, the current data corresponding to the equation description attribute of the second relation determine the way calculations are performed when preparing the quotation, and the plurality of relations determines the way that the relational database manipulates data to determine the way that the calculations affect the prepared quotation;
   an interface connected to the relational database and configured to allow access to the relational database; and
   a plurality of customizable interfaces corresponding to the various departments, each customized interface being connected to the relational database and configured to allow limited access to the relational database based on the work flow for the corresponding department.

13. A system for use by various departments to prepare a quotation, the system comprising:
   a relational database recorded on a computer-readable medium to assist in preparing the quotation, the relational database being accessed by the various departments and providing centralized data recorded on the computer-readable medium, the centralized data including a plurality of relations to relate manufacturing processes, cost parameters, calculations, and work flows for the various departments;
   wherein the plurality of relations includes a first relation including a quotation identification attribute, a second relation including a calculation identification attribute and an equation description attribute, and a plurality of additional relations that dictate the use of the second relation in preparing a quotation identified by data corresponding to the quotation identification attribute of the first relation;
   wherein the relational database is configured to allow modification of the second relation to modify data corresponding to the equation description attribute to change the way calculations are performed when preparing the quotation, thereby allowing techniques utilized to perform calculations to be customized as needed for particular applications;
   wherein the relational database is configured to process information in the relational database to prepare the quotation in accordance with the plurality of relations; wherein when preparing a quotation identified by data corresponding to the quotation identification attribute of the first relation, the current data corresponding to the equation description attribute of the second relation determine the way calculations are performed when preparing the quotation, and the plurality of relations determines the way that the relational database manipulates data to determine the way that the calculations affect the prepared quotation;
   an interface connected to the relational database and configured to allow access to the relational database; and
   a plurality of customizable interfaces corresponding to the various departments, each customized interface being connected to the relational database and configured to allow limited access to the relational database based on the work flow for the corresponding department and further based on a user status from a group including contributors and approvers.

* * * * *